(12) United States Patent
Mandel et al.

(10) Patent No.: US 10,317,277 B2
(45) Date of Patent: Jun. 11, 2019

(54) REFLECTIVE DEVICE FOR USE IN AN OPTICAL MEASURING SYSTEM

(71) Applicant: AIRBUS DS GMBH, Taufkirchen (DE)

(72) Inventors: Oliver Mandel, Baienfurt (DE); Dennis Weise, Constance (DE); Michael Chwalla, Dornbirn (AT)

(73) Assignee: Airbus DS GmbH, Taufkirchen (DE)

( * ) Notice: Subject to any disclaimer, the term of this patent is extended or adjusted under 35 U.S.C. 154(b) by 91 days.

(21) Appl. No.: 15/485,894

(22) Filed: Apr. 12, 2017

(65) Prior Publication Data
US 2017/0299428 A1    Oct. 19, 2017

(30) Foreign Application Priority Data
Apr. 15, 2016 (DE) .................. 10 2016 206 373

(51) Int. Cl.
*G01S 7/481* (2006.01)
*G01J 1/04* (2006.01)
(Continued)

(52) U.S. Cl.
CPC ............... *G01J 1/0414* (2013.01); *G01J 1/42* (2013.01); *G01S 7/481* (2013.01); *G01S 17/08* (2013.01); *G01S 17/74* (2013.01); *G01C 3/02* (2013.01)

(58) Field of Classification Search
CPC ..................................................... G01S 7/4812
See application file for complete search history.

(56) References Cited

U.S. PATENT DOCUMENTS

| 5,489,984 A | 2/1996 | Hariharan et al. |
| 5,530,549 A * | 6/1996 | Brown ............... G01B 11/00 356/622 |

(Continued)

FOREIGN PATENT DOCUMENTS

| DE | 3150642 C2 | 11/1983 |
| DE | 19647152 A1 | 5/1998 |

(Continued)

OTHER PUBLICATIONS

German Office Action for Application No. 102016206373 dated Dec. 9, 2016.

(Continued)

*Primary Examiner* — Thanh Luu
(74) *Attorney, Agent, or Firm* — Jenkins, Wilson, Taylor & Hunt, P.A.

(57) ABSTRACT

A reflective device for an optical measuring system and for arranging in a measuring object, including an optical deflection device and a retroreflector. The deflection device can deflect a light beam at the optical deflection device from an incident axis. The retroreflector can reflect the beam parallel to its incoming direction for each of various incoming directions of a light beam onto the retroreflector. The reflective device can be arranged in the measuring object such that a measuring beam of the optical measuring system, pointed at the measuring object and arriving at the optical deflection device in a first direction, is deflected by the optical deflection device onto the retroreflector in a different, second direction and, following reflection at the retroreflector, is deflected by the optical deflection device in reverse parallel to the first direction. An optical measuring system, a flying object and a flying object system are further described.

20 Claims, 9 Drawing Sheets

(51) Int. Cl.
    *G01J 1/42*     (2006.01)
    *G01S 17/08*     (2006.01)
    *G01S 17/74*     (2006.01)
    *G01C 3/02*     (2006.01)

(56) References Cited

U.S. PATENT DOCUMENTS

| | | |
|---|---|---|
| 5,991,011 A | 11/1999 | Damm |
| 6,327,038 B1 | 12/2001 | Maxey |
| 7,165,850 B2 | 1/2007 | Lee et al. |
| 2005/0157410 A1 | 7/2005 | Parker |
| 2013/0083323 A1 | 4/2013 | Tan et al. |

FOREIGN PATENT DOCUMENTS

| | | |
|---|---|---|
| DE | 102004042812 A1 | 7/2005 |
| EP | 0 236 137 A2 | 9/1987 |

OTHER PUBLICATIONS

Extended European Search Report for Application No. 17163598.0 dated Aug. 25, 2017.

* cited by examiner

REFLECTIVE DEVICE FOR USE IN AN OPTICAL MEASURING SYSTEM

CROSS-REFERENCE TO RELATED APPLICATION

This application claims priority to German Patent Application DE 10 2016 206 373.1 filed Apr. 15, 2016, the entire disclosure of which is incorporated by reference herein.

TECHNICAL FIELD

The present disclosure relates to a reflective device for use in an optical measuring system and for arranging in a measuring object, in particular for measuring distances on a flying object. The disclosure herein further relates to an optical measuring system, a flying object and a flying object system.

BACKGROUND

For the precise determination of distances and/or changes in distance between reference points that are far apart, for instance in satellite geodesy or for determining the distance between two satellites, optical measuring methods are often used. In these, a measuring beam is normally emitted from one of the reference points, for example from the earth or one of the satellites, in the direction of the other reference point, which is associated with another satellite or another measuring object. The measuring beam is reflected at the measuring object and detected on its return to the first reference point. In the detection, a running time or a phase position of the returned beam is determined, for example, from which finally a distance or a change in distance between the reference points can be determined.

Due to the often great distances between the reference points, a precise back reflection of the measuring beam within the measuring system is necessary. At the same time, flying objects, such as satellites, as measuring objects are often exposed to random variations and rotary movements, which also affect a reflective device of the measuring system arranged in the flying object. The relatively great distance between the reference points here has the consequence that, when using a simple mirror as a reflective device, for example, even a slight tilting of the flying object can result in a large divergence of the reflected measuring beam. A measurement can be distorted or even become impossible due to this.

To avoid such influences due to tilting, retroreflectors are normally used as reflective devices. These have the property of reflecting incident light over a larger solid angle range precisely counter to its incoming direction in each case. In addition, in the case of retroreflectors in the form of triple mirrors in particular, the path length of a light beam within the retroreflector is independent of a lateral offset of the beam from an axis through the point of reference of the triple mirror. Corresponding movements of the measuring object do not affect the measuring result, therefore. The point of reference of the triple mirror thus corresponds at the same time to a stable reference point, which is associated with the flying object in the context of the optical measuring system.

Even when using a retroreflector, however, a rotation of the flying object can cause the reflective device to be moved along the axis of the measuring beam. The measuring system would therefore indicate a change of distance, although the position of the centre of gravity of the flying object may not have changed. In addition, in the case of a rotation of the flying object parallel to the connecting axis between the reference points, the reflective device can move laterally out of the range of the incident measuring beam. Both problems can be countered by leading the axis of the measuring beam at least approximately through the centre of gravity of the flying object. However, this considerably limits the options of an arrangement of the reflective device and thus also of the other installations in the flying object.

In some cases, for instance in the case of the GRACE Follow-On satellite mission, the central connecting axis between two satellites is additionally already occupied by other applications. A laterally offset arrangement of the optical measuring system with a measuring beam reflected into itself, i.e. a so-called monostatic structure, would result in the disadvantages described in the case of rotations of the satellite. A bistatic construction has therefore been proposed, in which the incoming and the reflected measuring beam run laterally offset from one another. The measuring beam impacts the measuring object here away from the main axis and is led back with the same offset on the opposite side of the main axis. The distance between incoming and reflected measuring beam is selected here so that the measuring beam circulates around the applications of the two satellites lying on the main axis as on a racetrack.

Even if the influences of variations are largely compensated by the guidance of the measuring beam described, a triple mirror of considerable size is required to achieve the required relatively large distance between incoming and reflected measuring beam. To save space and weight, it has therefore been proposed to reduce the large triple mirror of this kind to a few functional sections and to arrange these segments distributed in the satellite. This in turn calls for a high thermomechanical stability of the mirror segments in relation to one another, which can only be achieved expensively on account of their wide distribution.

Known monostatic constructions also have the further disadvantage that beam tracking in the case of rotations of the measuring object is only possible with difficulty, since a tilting mirror arranged for this purpose in the measuring path, for instance, would directly influence the measuring result. On the other hand, the alternatively proposed realignment of the overall measuring object can likewise only be implemented expensively, especially in the case of a satellite.

A reflective device that avoids the disadvantages is therefore desirable.

SUMMARY

An object of the disclosure herein is to provide a compact reflective device that permits precise distance measurements and at the same time only makes minor demands on the design of the associated measuring object.

According to a first aspect, a reflective device is presented for use in an optical measuring system and for arranging in a measuring object. The reflective device comprises an optical deflection device and a retroreflector. The optical deflection device is configured to deflect a light beam arriving at the optical deflection device from an incident axis of the light beam. The retroreflector is configured to reflect the light beam parallel to its respective incoming direction for each of various incoming directions of a light beam onto the reflector. The retroreflector and the optical deflection device are arranged in the reflective device in such a way and the reflective device can be arranged in the measuring object in such a way that a measuring beam of the optical measuring system, which is pointed at the measuring object and arrives at the optical deflection device in a first direction, is deflected by the optical deflection device in a second direction different from the first direction onto the retroreflector and, following reflection at the retroreflector, is deflected by the optical deflection device in reverse parallel to the first direction.

The optical measuring system can be configured to determine at least one of a distance and a change in distance between a first reference point, which is associated with the measuring object, and a second reference point, which is movable with reference to the measuring object. The optical measuring system can be based in this case on the determination of at least one of a runtime and a phase position of light of the measuring beam reflected by the reflective device. For example, the optical measuring system can be based on the determination of a runtime or a phase position of light that has twice passed through the distance between the first and the second reference point. The phase position can be determinable by the measuring system on the basis of optical interference.

The reflective device can be configured in such a way and can be arranged in the measuring object in such a way that the first reference point is located outside of the reflective device. With reference to a measuring beam, which arrives at least substantially from the direction of the second reference point at the reflective device, a reflection of the first reference point can be produced in the reflective device.

The deflection device can deflect the measuring beam onto the retroreflector offset to a point of reference of the retroreflector. The reflective device can be configured in such a way in this case that a distance between a part of the measuring beam deflected in the second direction and a part of the measuring beam reflected by the retroreflector in reverse parallel to the second direction is different from a distance between a part of the measuring beam arriving in the first direction at the deflection device and a part of the measuring beam deflected, following reflection at the retroreflector, in reverse by the optical deflection device parallel to the first direction.

The retroreflector can be formed in one piece. The retroreflector can further comprise a triple mirror. In addition or alternatively to this, the retroreflector can comprise a prism, for example an Abbe Koenig prism.

The reflective device can be configured so that a distance between a part of the measuring beam deflected in the second direction and a part of the measuring beam reflected by the retroreflector in reverse parallel to the second direction is greater than a distance between a part of the measuring beam arriving in the first direction at the deflection device and a part of the measuring beam deflected, following reflection at the retroreflector, by the optical deflection device in reverse parallel to the first direction. In this case a diameter of the retroreflector can be smaller than the distance between the part of the measuring beam arriving in the first direction at the deflection device and the part of the measuring beam deflected, following reflection at the retroreflector, by the optical deflection device in reverse parallel to the first direction.

Alternatively to this, the reflective device can be configured so that a distance between a part of the measuring beam deflected in the second direction and a part of the measuring beam reflected by the retroreflector in reverse parallel to the second direction is smaller than a distance between a part of the measuring beam arriving in the first direction at the deflection device and a part of the measuring beam deflected, following reflection at the retroreflector, by the optical deflection device in reverse parallel to the first direction. In this case a diameter of the retroreflector can be greater than the distance between the part of the measuring beam arriving in the first direction at the deflection device and the part of the measuring beam deflected, following reflection at the retroreflector, by the optical deflection device in reverse parallel to the first direction.

The optical deflection device can comprise at least one mirror. In addition or alternatively to this, the optical deflection device can comprise at least one beam splitter. The beam splitter can be a cubic beam splitter. The beam splitter can also be a polarizing beam splitter. In this case the reflective device can further comprise at least one waveplate.

The optical deflection device can comprise two mirrors, which are aligned parallel to one another. The optical deflection device can deflect the measuring beam before and after reflection at the retroreflector on the same mirror plane respectively. Alternatively to this, several mirrors of the optical deflection device can be arranged in various mirror planes. Furthermore, a distance between the mirrors and/or the mirror planes can be adjustable.

The reflection of the first reference point can be produced outside of the retroreflector. For example, the reflection of the first reference point can be produced in a propagation direction of the measuring beam before or after the retroreflector.

The reflective device can further comprise a measuring device for determining a phase position of the measuring beam. The measuring device can comprise a photodetector and/or a lens. The measuring device can be configured to detect the phase position of the measuring beam at a measuring point of the measuring device.

The reflective device can further comprise a beam source for the measuring beam. The beam source can comprise a laser source and/or a tilting mirror. An injection of the measuring beam into a measuring path of the optical measuring system can be arranged at the measuring point of the measuring device. The tilting mirror of the beam source and the reflection of the first reference point can be arranged at least substantially at the same distance from the measuring point of the measuring device.

According to a second aspect, an optical measuring system is described, which comprises at least one reflective device according to the first aspect of the present disclosure. The optical measuring system can comprise at least two reflective devices for arrangement in different measuring objects respectively. In this case the optical measuring system can be configured to reflect the measuring beam repeatedly between the measuring objects by the reflective devices.

According to a third aspect, a flying object is described, which comprises a reflective device according to the first aspect. The flying object can be a satellite. The flying object can also serve as the measuring object in which the reflective device is disposed. The first reference point can lie within the flying object.

According to a fourth aspect, a flying object system is described, which comprises at least two flying objects of the type presented here, wherein the reflective devices are constituents of an optical measuring system of the type presented here.

BRIEF DESCRIPTION OF THE DRAWINGS

Other objects, features, advantages and application options result from the following description of practical examples, which are to be understood as not restrictive, with reference to the associated drawings. Here all features described and/or illustrated show the object disclosed here by themselves or in any combination, even regardless of their grouping in the claims or their back references. The dimensions and proportions of the components shown in the figures are not necessarily to scale in this case; they can differ from what is shown here in embodiments to be implemented.

DETAILED DESCRIPTION

Figure 1:
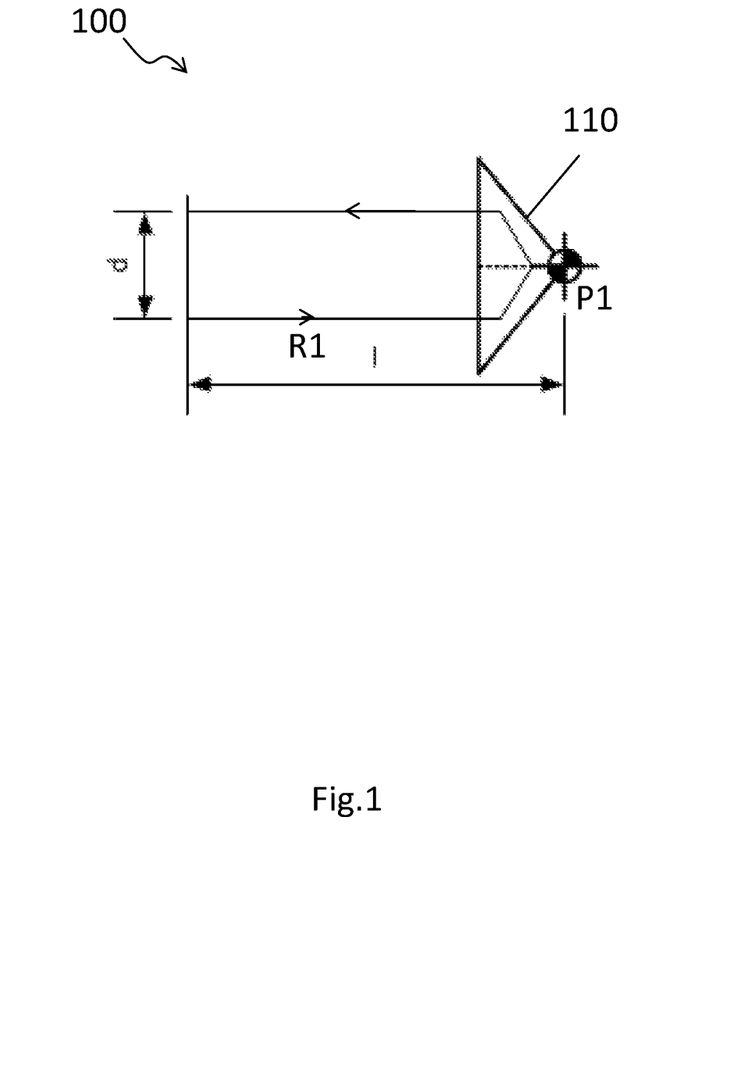
FIG. 1 illustrates an example of a reflective device for reflecting a measuring beam at a reference point.

FIG. 1 shows a schematic representation of an example of a reflective unit 100 for arranging in a measuring object and for use in an optical measuring system. The reflective unit 100 shown in FIG. 1 consists of or comprises a retroreflector 110 in the form of a triple mirror. The apex of the triple mirror represents both the point of reference of the retroreflector 110 and the first reference point P1 in the context of an optical measuring system (not shown) comprising the reflective unit 110.

As shown in FIG. 1, a measuring beam arriving at the retroreflector 110 in the incoming direction R1 is reflected, after multiple reflection within the retroreflector 110 if applicable, in reverse parallel to the incoming direction R1. Here the distance d between incoming and reflected measuring beam is proportional to an offset of the incoming measuring beam from the axis running in parallel through the point of reference of the retroreflector 110. At the same time, the path length covered by the measuring beam, starting out from a plane perpendicular to the beam direction up to arriving back at this plane following reflection at the retroreflector 110, is independent of such an offset. In the example of FIG. 1, this path length is therefore always twice the distance l between such a plane and the point of reference of the retroreflector 110. A variation of the impact point thus has no effect on the measurement. In the case of a hollow retroreflector, such as a hollow triple mirror, for instance, the path length is also independent of an angle of incidence onto the retroreflector 110. Even rotations of the retroreflector 110 about the reference point P1 thus have no effect on the measurement.

Figure 2:
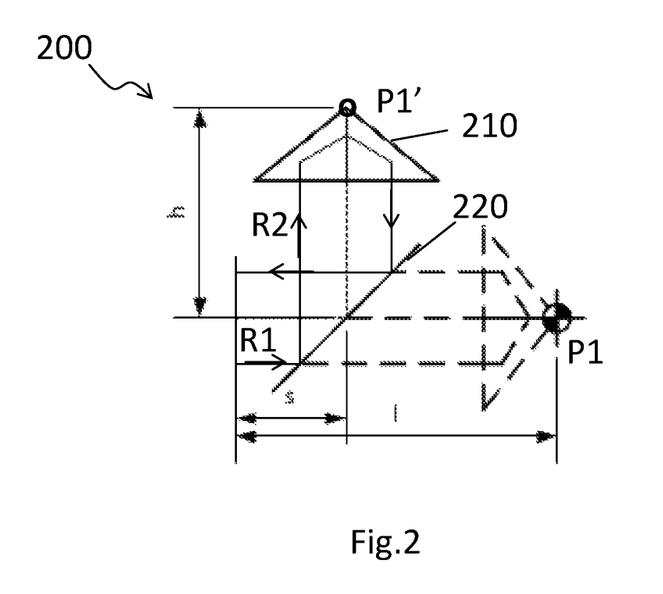
FIG. 2 is a schematic representation of a reflective device according to a first practical example of the present disclosure.

FIG. 2 shows a schematic representation of a reflective device 200 according to a first practical example of the present disclosure. Diverging from the example from FIG. 1 (cf. the dashed lines in FIG. 2), the reflective device 200 also comprises an optical deflection device 220 as well as a retroreflector 210. This deflects the measuring beam arriving in the incoming direction R1 onto the retroreflector 210 in a second direction R2 diverging from the incoming direction R1. In addition, the retroreflector 210 is arranged in such a way that its point of reference no longer lies at the reference point P1 of the optical measuring system. On the contrary, the reference point P1 is located outside of an area of the reflective device 200. The optical deflection device 220 is also arranged in such a way that it causes a reflection P1' of the reference point P1 within the reflective device 200. The deflection device 220 can be realized for this by a planar mirror, for example.

The reflective device 200 is based on the observation that the path length invariance described in connection with FIG. 1 is not adversely affected even by an optical deflection at the deflection device 220. A hollow retroreflector 210, such as a hollow triple mirror, for instance, is assumed here, the beam path of which remains in a medium of constant optical density. To illustrate the path length of the measuring beam through the arrangement, the axis that runs parallel to the incoming measuring beam and is reflected by the deflection device 220 through the point of reference of the retroreflector 210 is drawn in as an auxiliary line in FIG. 2. As is evident from FIG. 2, the length of this axis is s+h and it is identical to the length l from FIG. 1.

Due to the properties of the retroreflector 210 and the geometry shown in FIG. 2, it also results that, independently of an offset of the measuring beam, the path length measured from a plane perpendicular to this axis is twice the sum of distance s between the plane and the point of intersection of the axis with the mirror surface and of the distance h of this point to the point of reference of the retroreflector and thus, as in the example of FIG. 1, amounts to 2l. It also applies to the reflective device 200 that, in the event of rotations of the reflective device 200 about the reference point P1, the path length of the measuring beam within the reflective device 200 remains unchanged. In the reflective device 200, the reflection at a single plane of the deflection device 220 in particular causes the reflection P1' of the first reference point P1 of the measuring system to take place in turn at the point of reference of the retroreflector 210. The above also applies regardless of a deflection angle by the deflection device 220.

The reflective device 200 also acts independently of a distance h between the deflection device 220 and the retroreflector 210. In embodiments other than that shown in FIG. 2, a multiple deflection of the measuring beam, for instance by other deflection devices similar to the deflection device 220, can also be provided.

Seen from outside, the reflective device 200 from FIG. 2 has the same effect as the reflective device 100 from FIG. 1. Due to the spatial decoupling from the first reference point P1, however, the reflective device 200 facilitates expanded arrangement and configuration options of the reflective device 200 without deviating functionally from a preferred reference point P1. This is advantageous in particular in such cases in which the reference point P1 for an optical measuring system is not physically accessible in the measuring object, such as a satellite, for example.

Figure 3A:
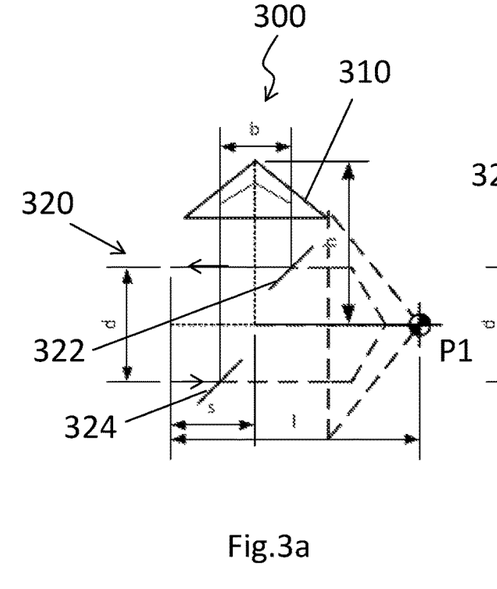
FIGS. 3a-3c are schematic representations of various realizations of a reflective device according to another practical example of the present disclosure.

FIG. 3a shows a schematic representation of a reflective device 300 according to a first realization of another practical example of the present disclosure. Like the reflective device 200 from FIG. 2, the reflective device 300 also comprises a retroreflector 310 and an optical deflection device 320. Diverging from FIG. 2, however, the deflection device 320 in the reflective device 300 comprises two separate mirrors 322, 324, which are arranged parallel to one another in different mirror planes.

In addition to deflection of the measuring beam, the arrangement of the mirrors 322, 324 permits a distance b of the measuring beam sections between the deflection device 320 and the retroreflector 310 to be produced that is different from a distance d of the measuring beam sections outside of the reflective device 300. The deflected beam sections can thus be brought together at any proximity. As shown by the dotted lines in FIG. 3, this permits the use of a retroreflector 310 of an arbitrarily small size compared with a conventional design, even with a wide spacing d of the outer measuring beam sections. The problems of space and weight resulting from the use of a large retroreflector can be avoided in this way. In addition, all components 310, 322, 324 are in a virtually linear arrangement with one another, while the mirrors 322, 324 also lie parallel to one another. Even compared with the distributed construction of a large triple mirror of differently aligned mirror segments, the reflective device 300 thus facilitates a more compact, simpler and thermomechanically easier to stabilize structure.

In one example of the reflective device 300, at least one of the mirrors 322, 324 is adjustable in position. The reflective device 300 can thus be set to any beam distance d when using the same retroreflector 310.

The reflection of the reference point P1 lies at half of the optical path length within the reflective device 300. At the same time, the following also applies to the reflective device 300, as illustrated by the auxiliary lines in FIG. 3, in regard to the path length l to the reference point P1:

$$2l = \left(s + \frac{b}{2}\right) + \left(h - \frac{d}{2}\right) + \left(h + \frac{d}{2}\right) + \left(s - \frac{b}{2}\right) = 2(s + h)$$

The path length thus remains in particular independent of the beam distances b, d and the angle of incidence.

Figure 3B:
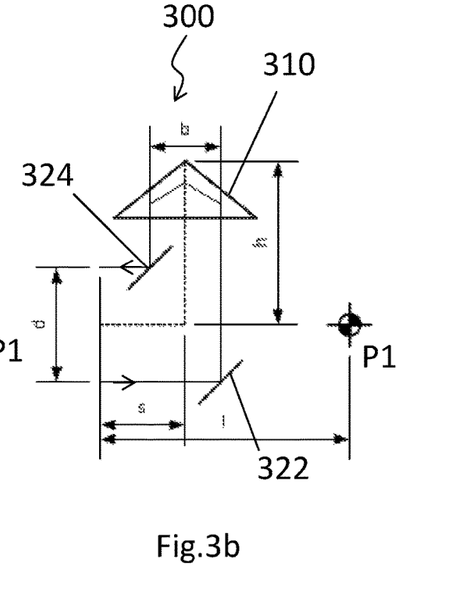

FIG. 3b shows another realization of the reflective device 300. Compared with the realization shown in FIG. 3a, the mirrors 322, 324 are arranged opposed in their height in FIG. 3b. With reference to the measuring beam, this has the result that this no longer crosses as in FIG. 3a.

In one example of the reflective device 300, the mirrors 322, 324 are adjustable in position. The reflective device 300 can thereby be set for different beam distances d. For example, the mirrors 322, 324 can be set in any position between the positions shown in FIGS. 3a and 3b.

Figure 3C:
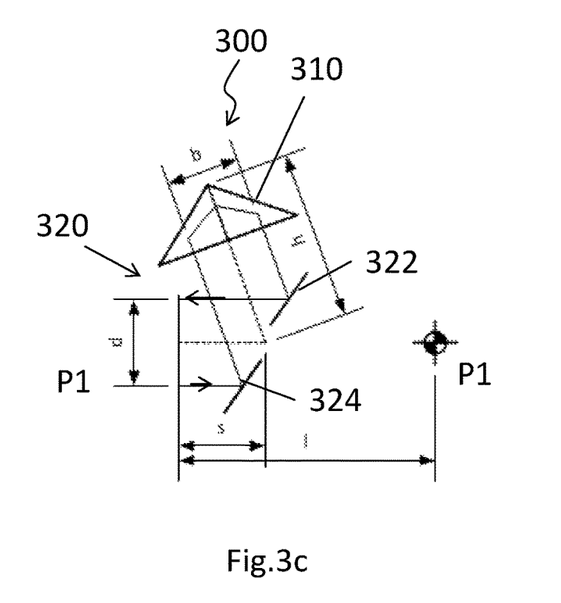

FIG. 3c shows another realization of the reflective device 300. In the realization shown in FIG. 3c, the retroreflector 310 is aligned at a different angle to the incoming measuring beam compared with FIGS. 3a and 3b, and the mirrors 322, 324 also correspondingly have another pitch angle. As illustrated by the auxiliary lines in FIG. 3c, however, even this arrangement does not basically influence the determination of the overall path length of the measuring beam within the reflective device 300.

In one example, the retroreflector 310 and/or the mirrors 322, 324 are adjustable in their orientation. As well as the angle of both mirrors, their spacing can also be changed as long as both mirrors are parallel and no other components block the light path.

Figure 4A:
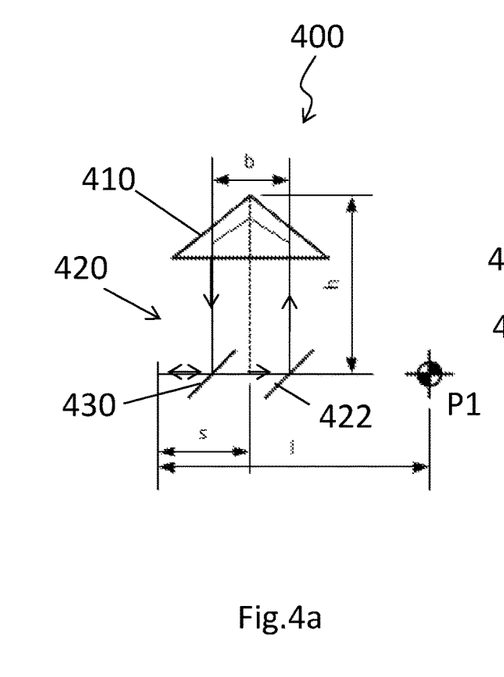
FIGS. 4a-4b are schematic representations of various realizations of a reflective device according to another practical example of the present disclosure.

FIG. 4a shows a schematic representation of a reflective device 400 according to another practical example of the present disclosure. Like the practical examples described above, the reflective device 400 also has a retroreflector 410 and an optical deflection device 420. However, in the case of the reflective device 400, the deflection device 420 comprises a beam splitter 430 as well as a mirror 422.

In the reflective device 400, a monostatic construction can be achieved by the beam splitter 430, i.e. the incoming and the reflected measuring beam overlap one another. At the same time, the construction shown permits the measuring beam to arrive at the retroreflector 410 in a decentralized manner. It is hereby avoided that the measuring beam arrives at one or more mirror edges of the retroreflector 410 and so the wavefront of the measuring beam is segmented. The noted principles with reference to the path length within the reflective device 400 apply accordingly to the reflective device 400 too.

A high efficacy is achieved using a polarized beam splitter 430 connected with a rotation of the polarization direction within the reflective device 400 by 90°. A p-polarized input beam is transmitted virtually completely at the beam splitter 430, for example, passes the mirror 422, the retroreflector 410 and at least one waveplate (not shown), is now reflected as s-polarized light by the beam splitter 430, so that a majority of the light output eventually exits the reflective device 400 again.

To compensate for the rotation of the polarization direction between input and output beam, a λ/4-waveplate can be set up (not shown) at the input in each case when using two reflective devices of a similar type in both measuring objects of an optical measuring system, which together produce a λ/2 waveplate. From this a circular polarization results in addition between the objects, which transitions through the waveplate into a linear polarization. On twisting of one of the objects about the line of sight, the full light output is constantly available on account of the circular polarization. Even a phase shift, which can be measured in the case of a rotation behind the λ/4 waveplate, is compensated again on passing in the other direction and thus has no effect on the measurement. If, in addition, a plate beam splitter is used as a beam splitter 430 at the input of the reflective device 400, as shown schematically in FIG. 4a, it is advantageous to reduce its angle-dependent influence on the optical path length by a compensation plate (not shown) rotated in the other direction.

Figure 4B:
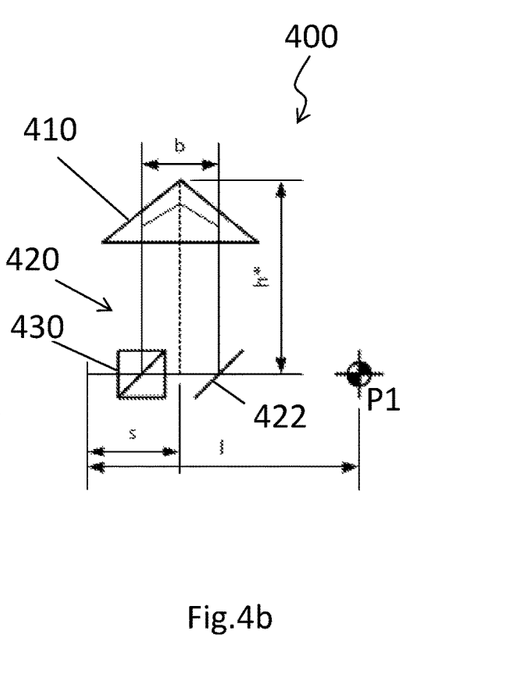

FIG. 4b shows another realization of the reflective device 400. Compared with the realization shown in FIG. 4a, a cube beam splitter 430 is provided instead of a plate beam splitter. For small angular deflections φ within the measuring system, the beam splitter cube—in spite of a longer path length as a whole in the substrate—can lead to a lower angular dependence. In the case of an edge length a and a refractive index n of the substrate, a pivot of the laser beam, i.e. the origin of the angular deflection, is displaced in a passage through the cube in the beam direction by the length $$\delta l = a\left(1 - \frac{1}{n}\right)\cos\phi$$

For small angles φ, cos(φ) is roughly 1, so that the angular dependence can be significantly reduced, while a passage through the beam splitter cube for the incoming and outgoing laser beam is the same and is thus compensated. Only a portion of constant path length is therefore added to a measurement.

Figure 5:
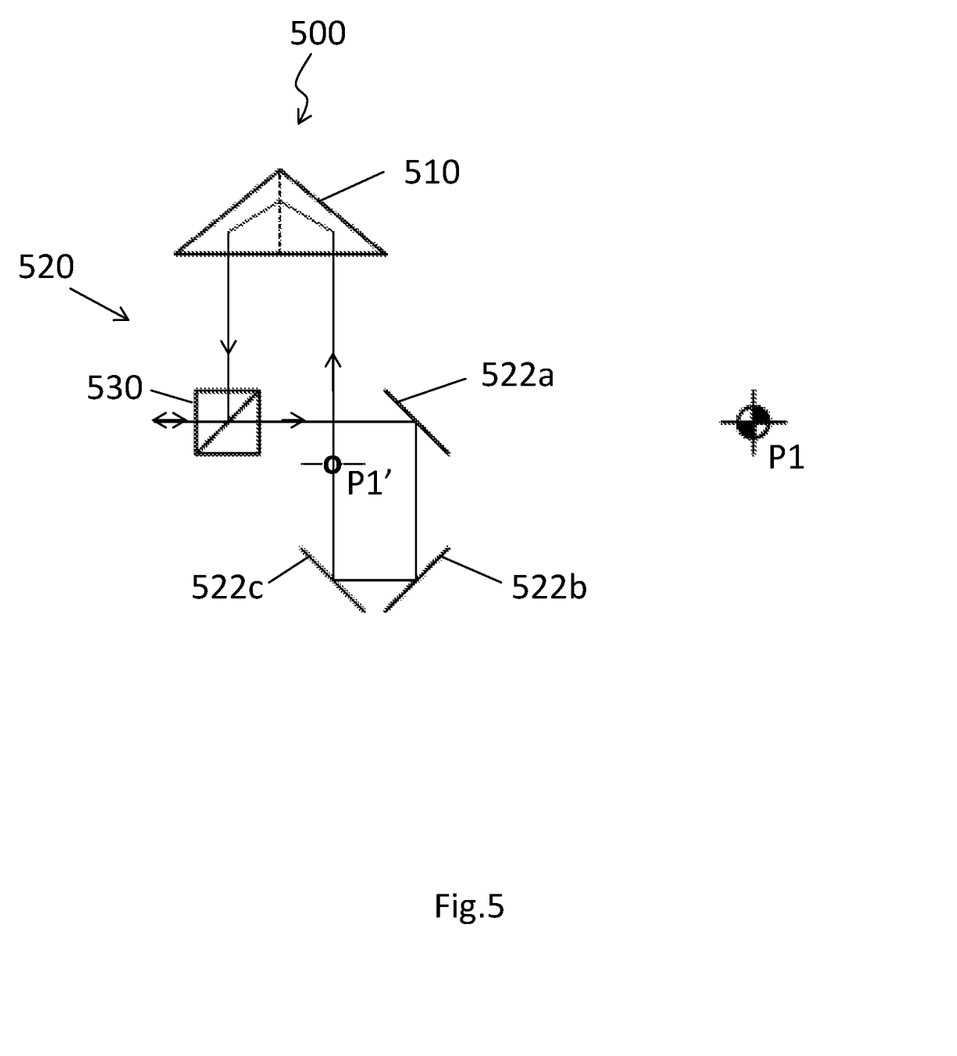
FIG. 5 is a schematic representation of a reflective device according to another practical example of the present disclosure.

FIG. 5 shows a schematic representation of a reflective device 500 according to another practical example of the present disclosure. Deviating from the reflective device 400 from FIG. 4, in the case of the reflective device 500 the optical deflection device 520 comprises several mirrors 522a, 522b, 522c as well as a beam splitter 530. The path of the measuring beam before the retroreflector 510 is extended by the mirrors 522a, 522b, 522c. The reflection P1' of the reference point P1 is thereby shifted by half of the added path length further ahead of the point of reference of the retroreflector 510. The reflection P1' of the reference point P1 can thus be localised in particular outside of the retroreflector 510. This is advantageous for the arrangement of other optical devices related to the reference point P1, such as an optical measuring head or a beam injection, for example. Thus an aperture, for example, is shown in FIG. 5 in the area of the reflection P1' of the reference point.

Figure 6:
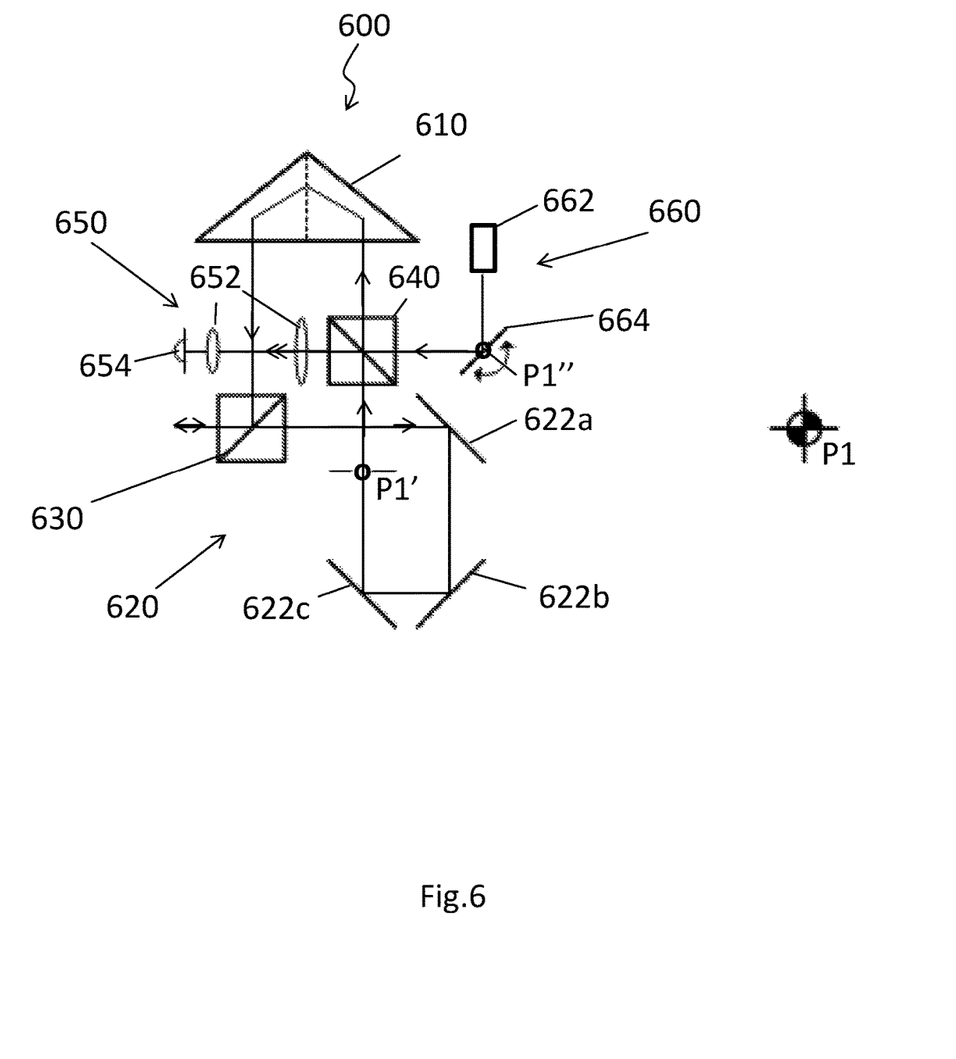
FIG. 6 is a schematic representation of a reflective device according to another practical example of the present disclosure.

FIG. 6 shows a schematic representation of a reflective device 600 according to another practical example of the present disclosure. Like the reflective device 500 according to FIG. 5, the reflective device 600 also comprises a retroreflector 610 and an optical deflection device 620 with several mirrors 622a, 622b and 622c and a beam splitter 630. In addition, in the reflective device 600 also the reflection P1' of the reference point P1 is displaced before the retroreflector 610. In contrast to FIG. 5, however, the reflective device 600 additionally comprises a measuring head 650 with one or more optical elements 652, for example an adjusting mirror and a lens, and a photodetector 654 as well as a beam source 660 with a laser source 662 and a tilting mirror 664, for example a scanner. The reflective device 600 further comprises another beam splitter 640.

The beam source 660 is used to generate a measuring beam of the measuring system and/or to amplify a measuring beam received by the reflective device 600 before it is re-emitted. In the latter case, the reflective device 600 acts as a transponder within the optical measuring system. Such an amplification of the measuring beam on half of its course is advantageous in the case of a large distance between the measuring objects in particular.

In the example shown, the beam splitter 640 is used both for beam injection for the beam source 660 and for light extraction as a measuring point for the measuring head 650. The provision of the measuring head 650 is advantageous if the reflective device 600 is connected with another reflective device of the type described into an optical measuring system, in which the reflective devices reflect the measuring beam produced by at least one of the reflective devices 600 between one another. The measuring beam generated by the beam source 660 is emitted in this case to the other reflective device and following its arrival back at the reflective device 600 is extracted by the beam splitter 640 to the measuring head 650. At the same time, the measuring beam is superimposed directly by a local partial beam of the laser light coming from the beam source 660, so that from the interference arising the phase position of the received measuring beam can be determined by the photodetector 654.

The beam emitted by the laser source 662 is deflected at the tilting mirror 664 in such a way that no relative tilting of the superimposed beams, i.e. of the local beam from the tilting mirror 664 and of the received measuring beam, is detected at the photodetector 654. The angle-dependent influence of the second beam splitter 640 corresponding to a tilting of the mirror 664 can be compensated here by extension of the paths to the retroreflector 610 and to the tilting mirror 664. In addition, in a monostatic system the pivot of the outgoing beam, i.e. the tilting mirror 664, and the reflection P1' of the reference point P1 in the incoming beam must lie at the same distance to the beam splitter 640, which superimposes the two beams.

If a pivot P1'' of the outgoing beam, for instance the tilting mirror 664, does not lie in reference point P1 or P1' of the system, this then leads, in the case of an angle change of the laser beams relative to the reflective device, to a parallel offset between incoming and outgoing beam. In a measurement over great distances, however, the beam radius at the input to the reflective device 600 is so large that a quasi-level wavefront is received and a beam offset delivers only a small error contribution. However, the reflective device 600 is then no longer in a purely monostatic operating mode, but changes the position of the measuring path between the measuring objects depending on the angle of incidence.

Compared with what has been described above, in conventional monostatic concepts the beam tracking on rotation about the reference point is realized by counter-rotation of the overall measuring object, in particular of an entire satellite, or by a mirror tilting mechanism, which deflects both the received and the transmitted beam, which is also described as in-field pointing. Changes in distance caused by these movements act directly on a signal measured in this way. By contrast, in the reflective device 600, the tilting mirror 664 facilitates beam tracking before injection of the measuring beam, i.e. outside of the measuring path. Compared with conventional monostatic structures, the measuring beam received can in addition be superimposed in the reflective device 600 by a local laser beam with a relatively smaller outlay due to the bistatic beam guidance within the reflective device 600, in order to determine the relative phase position as well as an angular offset of both beams and to continue the path of the received beam through the local laser beam.

The reflective device 600 is shown as a monostatic structure. However, the shift of the reference point reflection P1' and a beam injection and extraction can be realized correspondingly also for a bistatic structure. The direction tracking of the local laser beam can in particular take place even in this case outside of the measuring path. The mode of functioning of the reflective device is also maintained even if other mirrors are used ahead of the beam splitter 630, for example to change the path length or the orientation angle of the reflective device 600. Other examples of the reflective device 600 have only one of measuring head 650 and beam source 660. In other examples beam injection and extraction take place in addition at different points of the reflective device 600.

Figure 7:
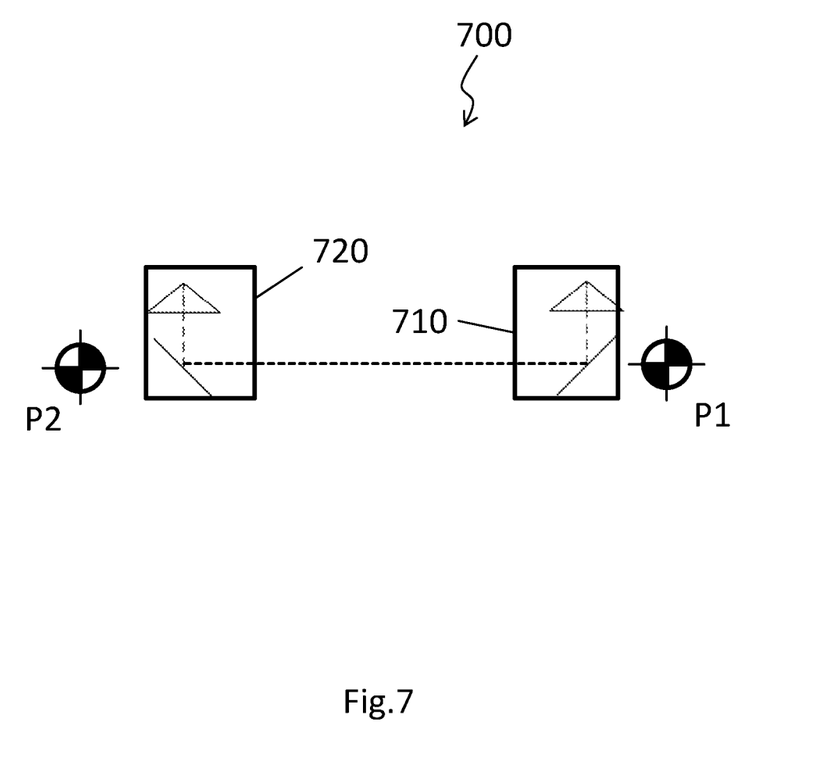
FIG. 7 is a schematic representation of an optical measuring system according to a practical example of the present disclosure.

FIG. 7 shows a schematic representation of an optical measuring system 700 according to a practical example of the present disclosure. The optical measuring system 700 comprises two reflective devices 710, 720, as described previously. In addition, each of the reflective devices is associated with a reference point P1, P2.

In the example shown, the reflective devices 710, 720 are arranged in such a way in relation to one another that a measuring beam can be emitted and reflected between them and amplified if necessary. Here a beam source in the reflective device 710, for example, serves as a primary source for the measuring beam, which is amplified prior to reflection by the reflective device 720 by the latter according to the mode of functioning of a transponder. The measuring system 700 is particularly suitable for use in satellite missions in which each of the reflective devices 710, 720 is arranged respectively in another satellite and each of the reference points P1, P2 is associated with the respective satellite in the context of a distance measurement.

Figure 8:
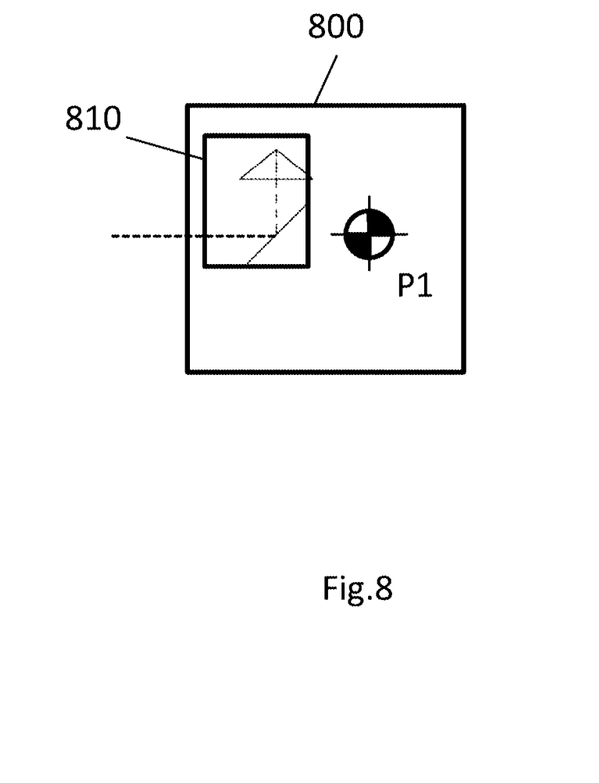
FIG. 8 is a schematic representation of a flying object with a reflective device according to a practical example of the present disclosure.

FIG. 8 shows a schematic representation of a flying object 800 according to a practical example of the present disclosure. The flying object 800 comprises a reflective device 810 as described previously for use as part of an optical measuring system.

In the flying object 800, the reference point P1 lies in the area of the flying object 800. In other examples the reference point 800 lies outside of the flying object, on the other hand. The flying object 800 is a satellite, for example. The reflective device 810 serves here as part of a measuring system, for example, for satellite geodesy or for measuring the distance between the flying object 800 and another flying object.

Figure 9:
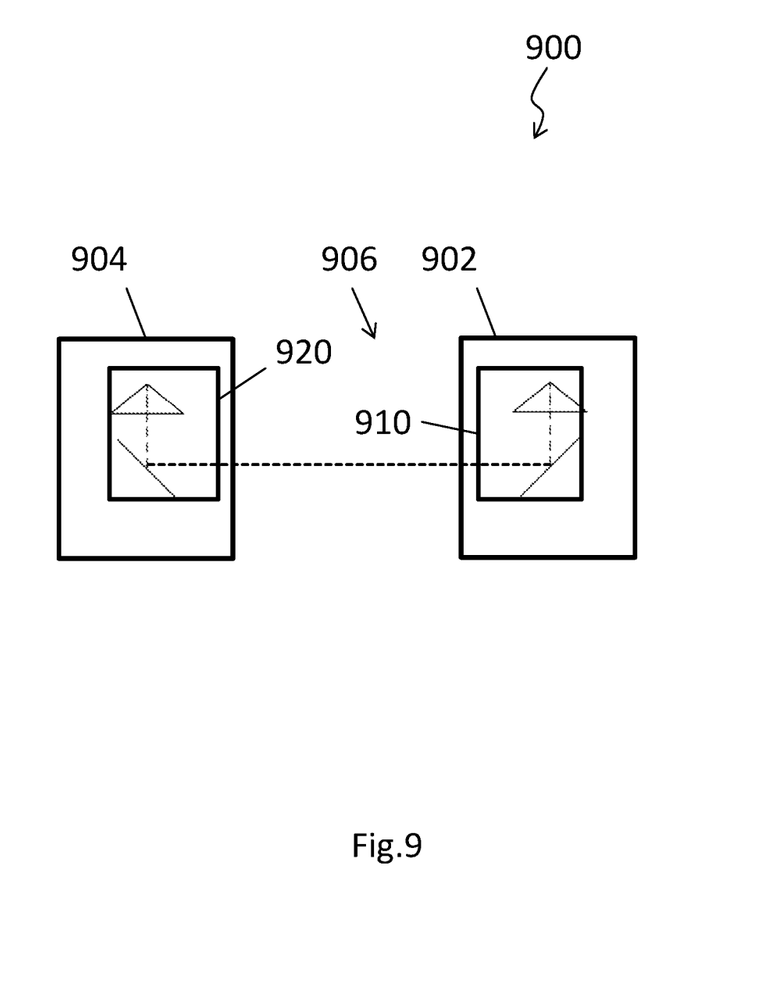
FIG. 9 is a schematic representation of a flying object system with an optical measuring system according to a practical example of the present disclosure.

FIG. 9 shows a schematic representation of a flying object system 900 according to a practical example of the present disclosure. The flying object system 900 comprises two flying objects 902, 904, in which a reflective device 910, 920 is arranged respectively as constituents of an optical measuring system 906.

The flying objects 902, 904 are two flying objects, for example, such as described in connection with FIG. 8. In addition, the optical measuring system 906 is a measuring system, for example, as described in connection with FIG. 7.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reflective device for use in an optical measuring system and for arranging in a measuring object, the reflective device comprising:
   an optical deflection device configured to deflect a light beam arriving at the optical deflection device from an incident axis of the light beam, the optical deflection device comprising two mirrors that are aligned parallel to one another; and
   a retroreflector configured to reflect the light beam parallel to its respective incoming direction for each of various incoming directions of a light beam onto the retroreflector,
   wherein the retroreflector and the optical deflection device are arranged in the reflective device such that and the reflective device can be arranged in the measuring object such that a measuring beam of the optical measuring system, which is pointed at the measuring object and arrives in a first direction at the optical deflection device, is deflected by the optical deflection device onto the retroreflector in a second direction different from the first direction and, following reflection at the retroreflector, is deflected by the optical deflection device in reverse parallel to the first direction.

2. The reflective device according to claim 1, wherein the retroreflector is formed in one piece.

3. The reflective device according to claim 1, wherein the mirrors are arranged in different mirror planes.

4. The reflective device according to claim 1, wherein a distance between the mirrors and/or the mirror planes is adjustable.

5. The reflective device according to claim 1, wherein the optical deflection device comprises at least one beam splitter.

6. The reflective device according to claim 1, wherein the optical measuring system is configured to determine at least one of a distance and a change of distance between a first reference point, which is associated with the measuring object, and a second reference point, which is movable in relation to the measuring object.

7. The reflective device according to claim 6, wherein the reflective device is configured such that, and can be arranged in the measuring object such that, the first reference point is located outside the reflective device and in relation to the measuring beam, which arrives at the reflective device at least substantially from the direction of the second reference point, a reflection of the first reference point is produced within the reflective device.

8. The reflective device according to claim 7, wherein the reflection of the first reference point is produced outside of the retroreflector.

9. The reflective device according to claim 1, comprising a measuring device for detecting a phase position of the measuring beam and/or a beam source for producing or amplifying the measuring beam.

10. The reflective device according to claim 9, wherein the reflective device comprises the measuring device and the beam source, and wherein a measuring point of the measuring device and an injection of a beam from the beam source are arranged at least substantially at the same point.

11. An optical measuring system comprising at least one reflective device for use in an optical measuring system and for arranging in a measuring object, the at least one reflective device comprising:
   an optical deflection device configured to deflect a light beam arriving at the optical deflection device from an incident axis of the light beam, the optical deflection device comprising two mirrors that are aligned parallel to one another; and
   a retroreflector configured to reflect the light beam parallel to its respective incoming direction for each of various incoming directions of a light beam onto the retroreflector,
   wherein the retroreflector and the optical deflection device are arranged in the reflective device such that and the reflective device can be arranged in the measuring object such that a measuring beam of the optical measuring system, which is pointed at the measuring object and arrives in a first direction at the optical deflection device, is deflected by the optical deflection device onto the retroreflector in a second direction different from the first direction and, following reflection at the retroreflector, is deflected by the optical deflection device in reverse parallel to the first direction.

12. The optical measuring system according to claim 11, wherein the retroreflector is formed in one piece.

13. The optical measuring system according to claim 11, wherein the mirrors are arranged in different mirror planes.

14. The optical measuring system according to claim 11, wherein a distance between the mirrors and/or the mirror planes is adjustable.

15. The optical measuring system according to claim 11, wherein the optical deflection device further comprises at least one beam splitter.

16. The optical measuring system according to claim 11, wherein the optical measuring system is configured to determine at least one of a distance and a change of distance between a first reference point, which is associated with the measuring object, and a second reference point, which is movable in relation to the measuring object.

17. The optical measuring system according to claim 11, comprising a measuring device for detecting a phase position of the measuring beam and/or a beam source for producing or amplifying the measuring beam.

18. The optical measuring system according to claim 17, wherein the reflective device comprises a measuring device and a beam source and wherein a measuring point of the measuring device and an injection of a beam from the beam source are arranged at least substantially at the same point.

19. A flying object comprising at least one reflective device for use in an optical measuring system and for arranging in a measuring object, the reflective device comprising:

an optical deflection device configured to deflect a light beam arriving at the optical deflection device from an incident axis of the light beam, the optical deflection device comprising two mirrors that are aligned parallel to one another; and a retroreflector configured to reflect the light beam parallel to its respective incoming direction for each of various incoming directions of a light beam onto the retroreflector, wherein the retroreflector and the optical deflection device are arranged in the reflective device such that and the reflective device can be arranged in the measuring object such that a measuring beam of the optical measuring system, which is pointed at the measuring object and arrives in a first direction at the optical deflection device, is deflected by the optical deflection device onto the retroreflector in a second direction different from the first direction and, following reflection at the retroreflector, is deflected by the optical deflection device in reverse parallel to the first direction.

20. A flying object system comprising at least two of the flying objects according to claim 19.

* * * * *